(12) United States Patent
Womack et al.

(10) Patent No.: US 11,071,385 B2
(45) Date of Patent: Jul. 27, 2021

(54) MOTORIZED FURNITURE CONTROL SYSTEM AND METHOD

(71) Applicant: La-Z-Boy Incorporated, Monroe, MI (US)

(72) Inventors: Robert B. Womack, Chattanooga, TN (US); Robert C. Beilfuss, Spring City, TN (US); Jason M. Baker, Dayton, TN (US)

(73) Assignee: La-Z-Boy Incorporated, Monroe, MI (US)

( * ) Notice: Subject to any disclaimer, the term of this patent is extended or adjusted under 35 U.S.C. 154(b) by 0 days.

(21) Appl. No.: 16/836,884

(22) Filed: Mar. 31, 2020

(65) Prior Publication Data

US 2020/0305605 A1    Oct. 1, 2020

Related U.S. Application Data

(60) Provisional application No. 62/827,774, filed on Apr. 1, 2019.

(51) Int. Cl.
*A47C 1/032* (2006.01)
*A47C 1/037* (2006.01)
(Continued)

(52) U.S. Cl.
CPC .......... *A47C 1/03211* (2013.01); *A47C 1/037* (2013.01); *G05B 11/01* (2013.01); *G08C 19/00* (2013.01)

(58) Field of Classification Search
CPC ..... A47C 1/03211; A47C 1/037; A47C 7/506; G05B 11/01; G08C 19/00
See application file for complete search history.

(56) References Cited

U.S. PATENT DOCUMENTS

2004/0015320 A1\* 1/2004 Nagaoka ............. A47C 20/041
702/150
2007/0174965 A1\* 8/2007 Lemire ............... A61G 7/0509
5/600
(Continued)

FOREIGN PATENT DOCUMENTS

KR    10-2003-0076348 A    9/2003
KR    10-2018-0047812 A    5/2018

OTHER PUBLICATIONS

International Search Report and Written Opinion of the International Searching Authority for Application No. PCT/US2020/026178, dated Jul. 22, 2020.

*Primary Examiner* — Sisay Yacob
(74) *Attorney, Agent, or Firm* — Harness, Dickey & Pierce, P.L.C.

(57) ABSTRACT

A control system for a piece of furniture includes a control panel configured to receive input from a user, a control module configured to control actuators coupled to movable components of the piece of furniture, and a battery system. The control module is configured to, in response to the input from the user indicating an intent to return the movable components to respective home positions, perform a homing sequence. The homing sequence includes selecting a first actuator according to a specified order, determining a home location for the selected actuator, and beginning to drive the selected actuator toward the home location. The homing sequence includes repeatedly selecting a next actuator according to the specified order and repeating the determining and the beginning. The homing sequence includes determining whether mains electricity is present and, if not, pausing the repeatedly selecting until less than a threshold number of actuators are in motion.

20 Claims, 24 Drawing Sheets

(51) Int. Cl.
    *G05B 11/01*     (2006.01)
    *G08C 19/00*     (2006.01)

(56) References Cited

U.S. PATENT DOCUMENTS

| | | | |
|---|---|---|---|
| 2010/0231421 A1* | 9/2010 | Rawls-Meehan | A61G 7/018 341/20 |
| 2015/0019020 A1* | 1/2015 | Hille | G05B 15/02 700/275 |
| 2016/0022039 A1* | 1/2016 | Paul | A47C 1/0342 297/88 |
| 2020/0253379 A1* | 8/2020 | Song | H03G 3/24 |

* cited by examiner

MOTORIZED FURNITURE CONTROL SYSTEM AND METHOD

CROSS-REFERENCE TO RELATED APPLICATIONS

This application claims the benefit of U.S. Provisional Application No. 62/827,774, filed on Apr. 1, 2019. The entire disclosure of the application referenced above is incorporated herein by reference.

FIELD

The present disclosure relates to motorized furniture and more particularly to control systems and methods for electrical control of the motors within furniture.

BACKGROUND

Replacing manual controls in furniture with motors may permit more precise and repeatable settings for various components of the furniture. For example, memory settings may allow different occupants of furniture to easily and repeatably position furniture for their respective greatest comfort. In addition, motorized control may enhance usability of some or all of the features by those with decreased mobility.

However, introducing electric motors creates engineering problems, such as a large current draw when multiple motors are operating at the same time. In addition, difficulties may arise when wall power is not available due to a power outage or a circuit breaker trip. Further, the user interface to the furniture requires attention so that use of the furniture is intuitive, safe, and ergonomic. The systems and methods described in the present disclosure address and resolve these engineering difficulties.

SUMMARY

A control system for a piece of furniture includes a control panel configured to receive input from a user, a control module configured to communicate with the control panel and to control a plurality of actuators coupled to movable components of the piece of furniture, and a battery system configured to store energy from mains electricity and provide the energy to the control module in the absence of the mains electricity. The control module is configured to, in response to the input from the user indicating an intent to return the movable components to respective home positions, perform a homing sequence. The homing sequence includes selecting a first actuator of the plurality of actuators according to a specified order. The homing sequence includes determining a home location for the selected actuator according to the home position of a respective one of the movable components. The homing sequence includes beginning to drive the selected actuator toward the home location. The homing sequence includes repeatedly selecting a next actuator of the plurality of actuators according to the specified order and repeating the determining and the beginning for the next actuator. The homing sequence includes determining whether the mains electricity is present. The homing sequence includes, in response to determining that the mains electricity is absent, pausing the repeatedly selecting while a threshold number of the plurality of actuators are in motion and resuming the repeatedly selecting once less than the threshold number of the plurality of actuators are in motion.

In other features, the home positions of the movable components correspond to a configuration of the piece of furniture that is easiest for the user to exit from. In other features, the threshold number is 2. In other features, the control module is configured to adjust the specified order according to a capacity of the battery system. In other features, the movable components include a leg supporting component and a head supporting component. The control module is configured to place the leg supporting component prior to the head supporting component in the specified order in response to the capacity of the battery system being below a first capacity. The control module is configured to place the head supporting component prior to the leg supporting component in the specified order in response to the capacity of the battery system being above the first capacity.

In other features, the control module is configured to, in response to the input from the user indicating an intent to move the movable components to a first configuration of positions that are different from the home positions, determine whether the mains electricity is present and, in response to concurrence of the mains electricity being absent and a capacity of the battery system being below a first capacity, ignore the intent to move the movable components to the first configuration. In other features, the control module is configured to, in response to the input from the user indicating the intent to move the movable components to the first configuration, determine whether the mains electricity is present and, in response to concurrence of the mains electricity being absent and the capacity of the battery system being greater than the first capacity, limit a number of concurrently moving actuators to a specific number.

In other features, the control module is configured to read, from the plurality of actuators, position data and set an indeterminate position flag in response to the position data representing an unexpected configuration of the movable components. The control module is configured to perform the homing sequence in response to the indeterminate position flag being set. In other features, the control module is configured to set the indeterminate position flag in response to a determination that a factory positioning sequence has not yet been performed for the piece of furniture. In other features, the control module is configured to set the indeterminate position flag in response to a determination upon power-on of the control module that at least one of the plurality of actuators was in motion at a time that power was lost to the control module.

In other features, the control system includes a multi-conductor connector between the control panel and the control module. The control panel is configured to measure a voltage on a predetermined conductor of the multi-conductor connector and interpret the user input according to the voltage. In other features, the control panel is configured to receive first and second user inputs. The control panel is configured to, in response to the voltage being greater than a threshold, interpret the first user input as an intent to move one of the plurality of actuators in a first direction and the second user input as an intent to move the one of the plurality of actuators in a second direction opposite the first direction. The control panel is configured to, in response to the voltage being less than the threshold, interpret the first user input as an intent to move the one of the plurality of actuators in the second direction and the second user input as an intent to move the one of the plurality of actuators in the first direction. In other features, the control panel includes a microcontroller with a plurality of pins and the microcontroller is configured to measure the voltage using a predetermined pin of the plurality of pins and subsequently use the predetermined pin to output audio data from the microcontroller.

A method of operating a control system for a piece of furniture includes receiving input from a user. The method includes, in response to input from the user indicating an intent to return movable components of the piece of furniture to respective home positions, performing a homing sequence. The homing sequence includes selecting a first actuator of a plurality of actuators according to a specified order. The homing sequence includes determining a home location for the selected actuator according to the home position of a respective one of the movable components. The homing sequence includes beginning to drive the selected actuator toward the home location. The homing sequence includes repeatedly selecting a next actuator of the plurality of actuators according to the specified order and repeating the determining and the beginning for the next actuator. The homing sequence includes determining whether mains electricity is present. The homing sequence includes, in response to determining that the mains electricity is absent, pausing the repeatedly selecting while a threshold number of the plurality of actuators are in motion and resuming the repeatedly selecting once less than the threshold number of the plurality of actuators are in motion.

In other features, the method includes adjusting the specified order according to a capacity of a battery system of the control system. In other features, the movable components include a leg supporting component and a head supporting component. The method includes placing the leg supporting component prior to the head supporting component in the specified order in response to the capacity of the battery system being below a first capacity. The method includes placing the head supporting component prior to the leg supporting component in the specified order in response to the capacity of the battery system being above the first capacity.

In other features, the method includes, in response to the input from the user indicating an intent to move the movable components to a first configuration of positions that are different from the home positions, determining whether the mains electricity is present and, in response to concurrence of the mains electricity being absent and a capacity of a battery system of the control system being below a first capacity, ignoring the intent to move the movable components to the first configuration. In other features, the method includes, in response to the input from the user indicating the intent to move the movable components to the first configuration, determining whether the mains electricity is present and, in response to concurrence of the mains electricity being absent and the capacity of the battery system being greater than the first capacity, limiting a number of concurrently moving actuators to a specific number.

In other features, the method includes reading, from the plurality of actuators, position data. The method includes setting an indeterminate position flag in response to the position data representing an unexpected configuration of the movable components. The method includes performing the homing sequence in response to the indeterminate position flag being set. In other features, the method includes setting the indeterminate position flag in response to a determination that at least one of the plurality of actuators was in motion at a time that the mains electricity was lost.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Block Diagrams

Figure 1:
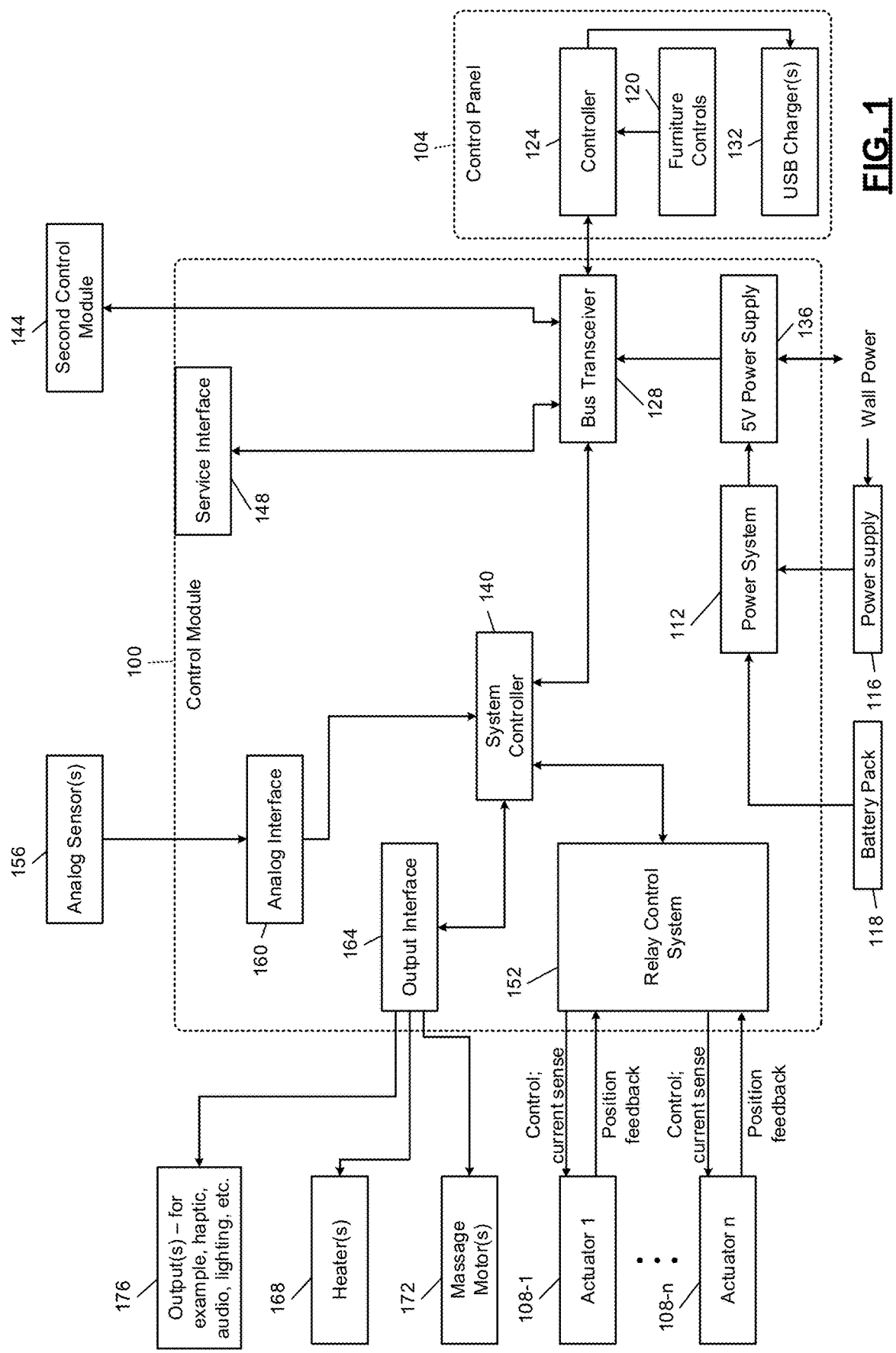
FIG. 1 is a functional block diagram of an example implementation of a furniture control module according to the principles of the present disclosure.

FIG. 1 shows a control module 100, also known as a furniture control module or a master control module (MCM). The control module 100 receives user input, such as via a control panel 104, and controls one or more actuators 108-1, . . . 108-N (referred to collectively as actuators 108).

The control module 100 includes a power system 112 that receives wall power (also known as grid power, utility power, or mains electricity). For example, a power supply 116 (which may be external as shown in FIG. 1) may receive wall power and condition or convert the power. For example, the power supply 116 may transform the wall power to a lower voltage alternating current or may convert the wall power into a direct current power supply. As examples only, the wall power may be 230 Volt 50 Hz alternating current power or 120 Volt 60 Hz alternating current.

The power system 112 may also be configured to receive power from a battery pack 118. The battery pack 118 may be a rechargeable battery pack, in which case the power system 112 may be able to recharge the battery pack 118 based on power from the power supply 116. In other implementations, the battery pack 118 may include non-rechargeable batteries, such as 9V alkaline batteries. In various implementations, both rechargeable and non-rechargeable battery packs may be provided and connected to the power system 112.

The control panel 104 includes furniture controls 120, which may be one or more touch- or pressure-activated inputs. For example, the furniture controls 120 may include pushbuttons, rocker switches, touch-sensitive buttons, a touchscreen, etc. As shown in FIG. 1, the control panel 104 includes a controller 124 that reads input from the furniture controls 120 and transmits that input to the control module 100 via a bus transceiver 128 of the control module 100.

For example, the controller 124 may send a bus message to the bus transceiver 128 in response to a momentary press of a button of the furniture controls 120. In response to a press and hold of one of the buttons of the furniture controls 120, the controller 124 may send a button press message to the bus transceiver 128 followed eventually by a button release message. In the interim, the controller 124 may continue to send "button remains pressed" messages to the bus transceiver 128.

For the user's convenience, the control panel 104 may include one or more universal serial bus (USB) chargers 132. Although shown within the outline of the control panel 104, one or more of USB chargers 132 may be located separately from the control panel 104. For example, for user convenience, the USB chargers 132 may be distributed between left and right sides of a piece of furniture. To power the USB chargers 132, an appropriate voltage source, such as a 5V power supply 136 provides power to the control panel 104. For example, the 5V power supply 136 may power the bus transceiver 128 which provides power to the control panel 104.

A system controller 140 of the control module 100 receives information about user inputs via the bus transceiver 128. The system controller 140 may also control whether the USB chargers 132 are active. In response to a command to deactivate the USB chargers 132, the controller 124 may cut off power flowing to some or all of the USB chargers 132.

In furniture where there are multiple sets of actuators, such as in a sofa with multiple reclining seating positions, the system controller 140 may coordinate with corresponding control modules. In FIG. 1, a second control module 144 is shown for illustration. A service interface 148 connected to the bus transceiver 128 may permit assemblers at a manufacturing facility or technicians at a repair facility to obtain diagnostic information, perform calibration, and troubleshoot issues. In various implementations, the bus transceiver 128 may use a variation of the local interconnects network (LIN) bus.

The control module 100 controls the actuators 108 using a relay control system 152. When controlling the actuator 108-1, the relay control system 152 may sense the amount of current being supplied to the actuator 108-1. In addition, the relay control system 152 may receive positioning feedback from the actuator 108-1. For example, the position feedback may include counts from an encoder, which may be detected using a Hall Effect sensor. As described in more detail below, this position feedback may not be completely reliable if the actuator has recently stopped moving or was in fact still moving when power was removed from the control module 100.

The system controller 140 may receive input from other sources, such as one or more analog sensors 156. The analog sensors 156 may include an occupancy sensor. An analog interface 160 receives and transforms, such as by converting into digital signals, information from the analog sensors 156 for provision to the system controller 140.

The control module 100 may also generate additional outputs beyond controlling the actuators 108. For example, an output interface 164 of the control module 100 may control one or more heaters 168, one or more massage motors 172, and one or more user outputs 176. For example, the user outputs 176 may include one or more of haptic feedback actuators, audio outputs, lighting, etc. In various implementations, the output interface 164 may output pulse-width modulation (PWM) signals.

Figure 2:
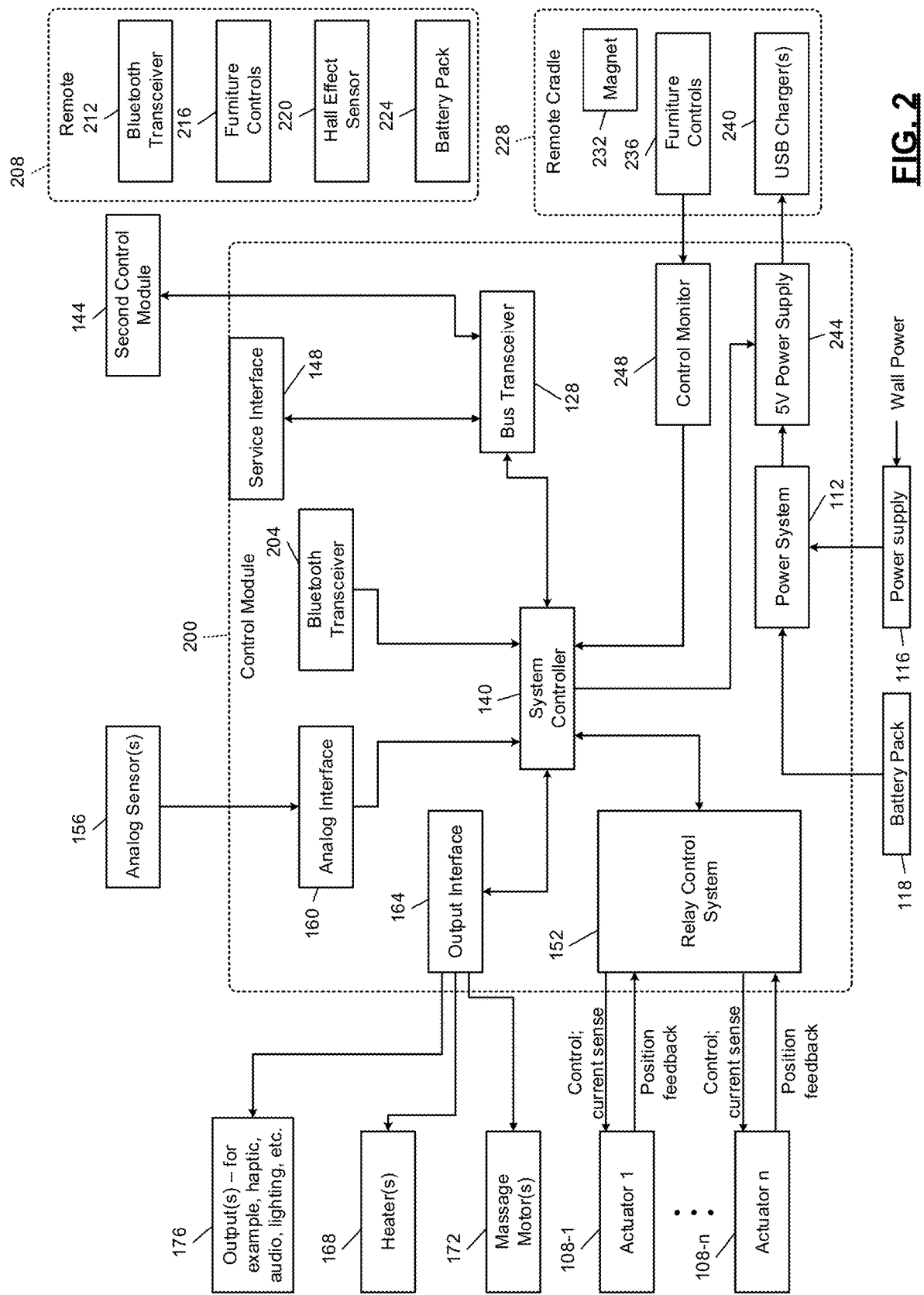
FIG. 2 is a functional block diagram of another example implementation of a furniture control module according to the principles of the present disclosure.

In FIG. 2, a wireless remote variant of a controller architecture includes a control module 200. The control module 200 includes a Bluetooth transceiver 204 that wirelessly communicates with a remote 208. The remote 208 includes a Bluetooth transceiver 212, furniture controls 216, a Hall Effect sensor 220, and a battery pack 224. The furniture controls 216 may be the same as or a rearranged version of the furniture controls 120 of FIG. 1.

The remote 208 may be stored in a remote cradle 228 when not in use. Although not shown, the remote cradle 228 may charge the battery pack 224 of the remote 208 while located in the remote cradle 228. The remote cradle 228 may include a magnet 232, which may be detected by the Hall Effect sensor 220 of the remote 208 to indicate to the remote 208 that it is located in the remote cradle 228.

The remote cradle 228 may include furniture controls 236, which may be a superset or a subset of the furniture controls 216. In various implementations, the furniture controls 236 may include an input indicating the user's desire to return the furniture to a home position and/or to one or more memory positions. In addition, the furniture controls 236 may also include controls for pairing the remote 208 to the control module 200.

In various implementations, the remote cradle 228 may also include one or more USB chargers 240. As described above with respect to FIG. 1, the USB chargers 240 may not all be co-located in the remote cradle 228. The USB chargers 240 may receive power from a 5V power supply 244. The 5V power supply 244 may be the same as the 5V power supply 136 of FIG. 1. The 5V power supply 244 may be controllable by the system controller 140 to interrupt power to the USB chargers 240 in order to deactivate the USB chargers 240. For example, the USB chargers 240 may be deactivated when operating from battery power rather than wall power.

The same reference numeral is used for the system controller 140 although separate system controllers may be used for the control module 100 compared to the control module 200. In the examples shown in FIG. 1 and FIG. 2, the system controller 140 is shown with the same reference numeral to indicate that common software and hardware may be used for the system controller 140 though the software may operate differently depending on whether the system controller 140 is present in the control module 100 or the control module 200. The control module 200 may include a control monitor 248, which scans the furniture controls 236. For example, the control monitor 248 may monitor the resistance through each of the furniture controls 236 to detect whether a button is being pressed. The control monitor 248 then supplies this information to the system controller 140.

Flowcharts

Figure 3:
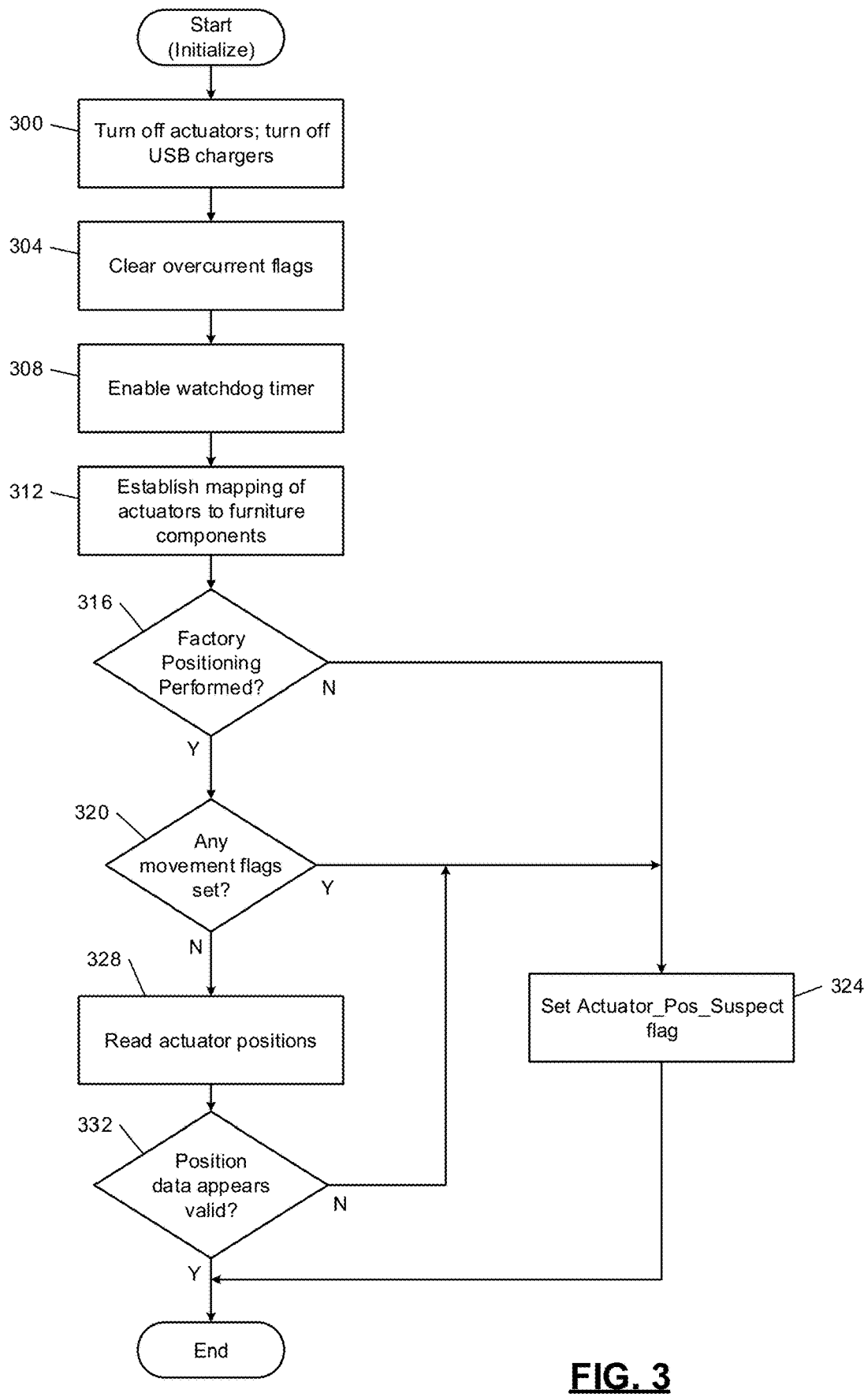
FIG. 3 is a flowchart showing example initialization operation of a furniture control module.

In FIG. 3, initialization control begins at 300. For example, this control may be performed by the control module 100 or the control module 200. At 300, control turns off actuators and turns off USB chargers. At 304, control clears overcurrent flags for the actuators. At 308, control enables a watchdog timer. The watchdog timer may prevent control software from inadvertently becoming stuck in an endless loop.

At 312, control establishes a mapping of actuators to furniture components. For example, this mapping may be a predetermined table indicating which actuator corresponds to which segment of a recliner: such as headrest, footrest, lumbar, back, and legrest. Control continues at 316 and determines whether factory positioning has yet been performed on the furniture. If so, control transfers to 320; otherwise, control transfers to 324.

At 320, control determines whether any movement flags are currently set. If so, control transfers to 324; otherwise, control transfers to 328. Movement flags are set while an actuator is moving and cleared upon the movement stopping. In some implementations, such as are described in FIG. 8, the flag may be cleared a predetermined period of time after movement has ended. At 324, factory positioning has not yet been performed or power was removed from the control module prematurely, so control sets a flag (Actuator_Pos_Suspect) to indicate that the position of one or more actuators is suspect. The initialization control then ends. The actuator position suspect (Actuator_Pos_Suspect) flag may also be referred to as an indeterminate position flag.

At 328, the positions of actuators are presumed to be accurate and therefore are read from memory for use in actuator control. At 332, control assesses whether the position data appears to be valid. For example, this may check whether position data is within bounds and whether there are any incompatible pieces of data. For example, the legrest and footrest may not be able to be adjusted in certain incompatible configurations and position data reflecting such incompatible configurations would be presumed to be invalid. If the position data appears valid, control ends; otherwise, control returns to 324.

Figure 4:
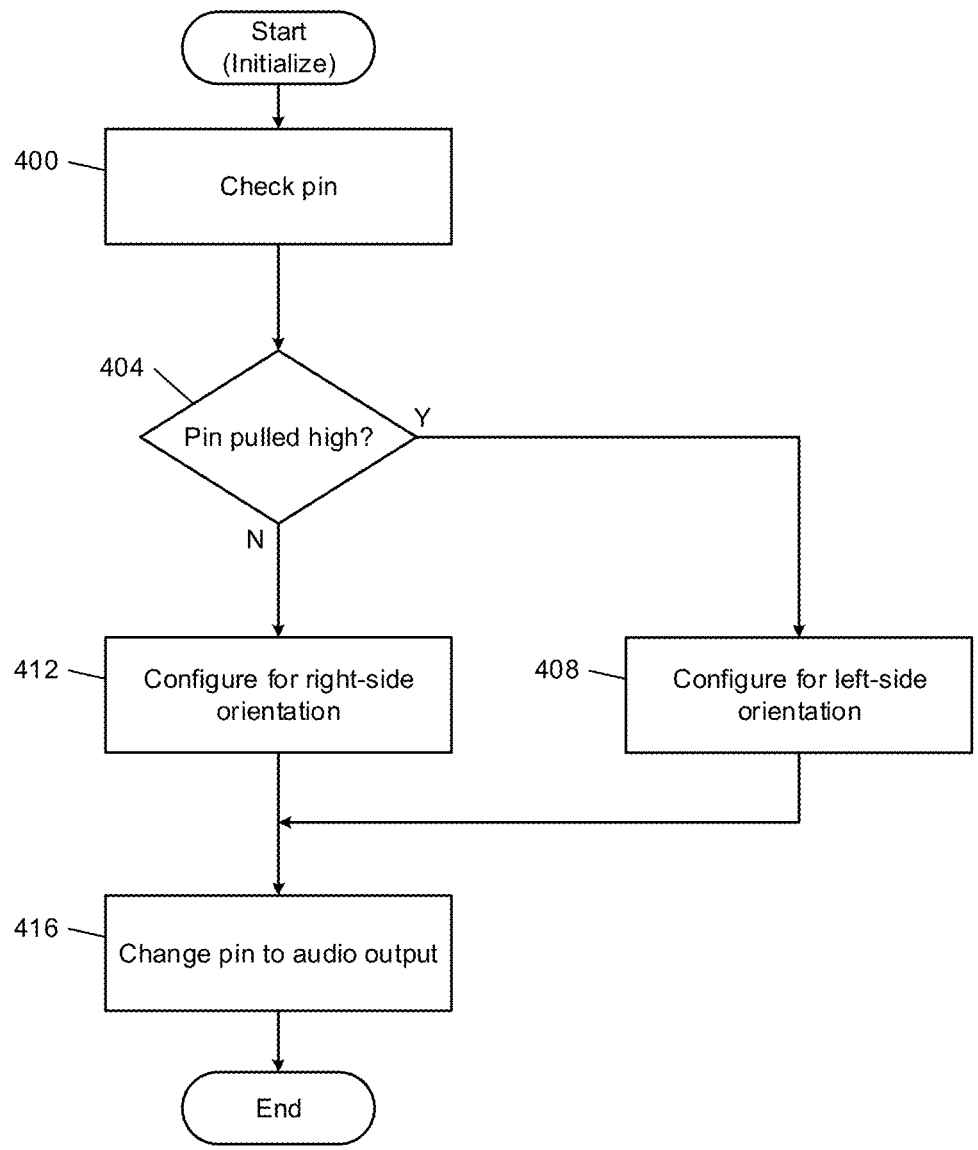
FIG. 4 is a flowchart of example initialization operation of a user interface control panel.

In FIG. 4, initialization operation of a control panel, such as the control panel 104 of FIG. 1, begins at 400. In various implementations, the control panel 104 may alternately be positioned on the left side of a piece of furniture or the right side. This decision may be based on buyer preference, such as avoiding placing the control panel 104 directly next to an end table.

The control panel 104 may be interchangeable between sides of the furniture. However, based on which side of the furniture the control panel 104 is located, the furniture controls 120 may have the reverse effect. For example, a rocker switch that extends and retracts the legrest may instead retract and extend the legrest when the control panel 104 is located on the opposite side. In FIG. 4, one approach to determining on which side the control panel 104 is installed relies on a hardware difference.

For example, the cable connecting the control panel 104 to the control module 100 may have a different length and a different arrangement depending on whether the control panel 104 is located on the left side or the right side of a piece of furniture. The two cables in those two configurations may be configured differently electrically. For example, in one configuration, the cable may omit one of the wires. This omission may be detected by the control panel 104 according to the operation shown in FIG. 4.

At 400, a controller (such as the controller 124 of the control panel 104) checks a specific pin. At 404, if that pin is pulled high, control transfers to 408; otherwise, control transfers to 412. The pin may be pulled high by a wire connected back to the control module. For example, a pull-up resistor at the control module may pull the voltage to the pin to a positive power supply voltage. However, if the pin is not pulled high (at 412), this indicates that the wire is omitted from the cable.

In the example of FIG. 4, the wire being omitted from the cable (412) corresponds to a configuration in which the control panel 104 is positioned on the right side of the furniture. Therefore, the right-hand orientation is used to interpret user controls. At 408, the wire is present and therefore the user controls are interpreted according to the control panel being installed on the left side of the furniture. In both cases, control continues at 416, where the pin may be used subsequent to initialization for audio output. For example, the audio output may be used to provide feedback indicating when the current configuration of the furniture is successfully stored as a memory position. Control then ends.

Figure 5:
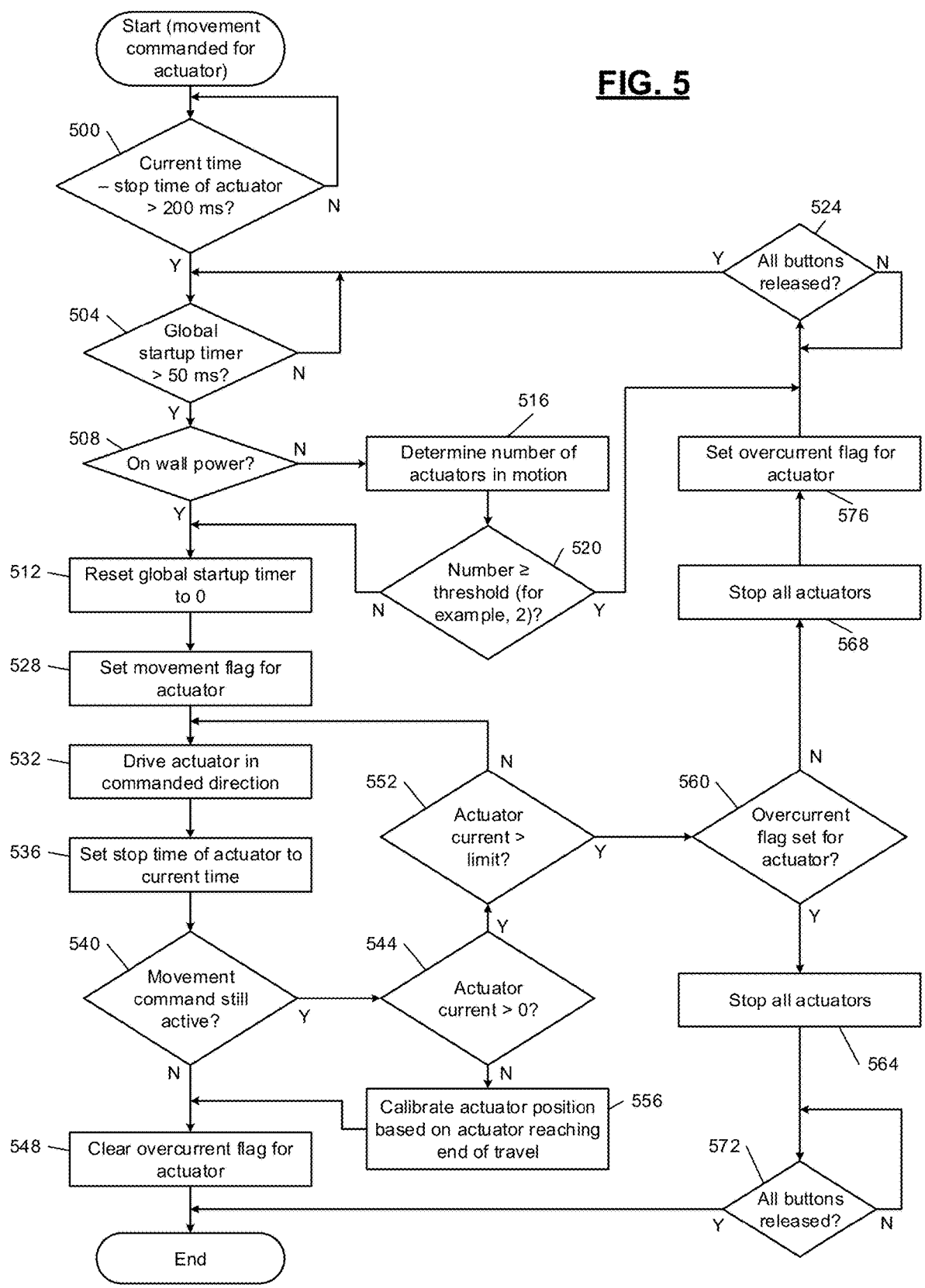
FIG. 5 is a flowchart showing example movement operation of an actuator within the furniture.

FIG. 5 shows example operation used in controlling actuator movement. The actuator movement may be initiated by manual user control, by a home sequence, or by a memory sequence. In some implementations, the home sequence may not be expressly initiated by the user but by the system controller, such as to calibrate positions of the actuators or return to a starting point following a power failure.

Movement control of a particular actuator begins at 500, where control determines whether the current time is more than 200 ms following the stop time of the particular actuator. The value of 200 ms is predetermined and may be based on parameters of the motor as well as mechanical properties of the component operated by the motor. This predetermined interval prevents the same actuator from beginning movement too close in time to the ending a prior movement. If the current time minus the last stop of the actuator is greater than 200 ms, control transfers to 504; otherwise, control remains at 500.

At 504, control determines whether a global startup timer exceeds a threshold value. If so, control transfers to 508; otherwise, control remains at 504. The global startup timer is reset every time an actuator starts movement. To avoid the high startup current from multiple motors being experienced by the power supply all at one time, the threshold value (in this example, 50 ms) is used to stagger startup times of the motors. The value of 50 ms may be determined empirically by designers as the time at which current has fallen to a predetermined percentage (such as 50%) of the startup current.

At 508, control determines whether the furniture is operating on wall power. If so, control continues at 512; otherwise, control transfers to 516. At 516, control determines the number of actuators currently in motion. At 520, control compares that number to a threshold (such as 2). If the number is greater or equal to the threshold, control transfers to 524; otherwise, control continues at 512.

This threshold may be set so that only a certain number of actuators are operating at any one time to prevent an excessive current draw on the non-wall power source (that is, the battery pack). Higher current draw may decrease the charge stored by the battery pack and may even lower the overall lifetime and long-term charge storage capacity of the battery pack. At 524, control determines whether all buttons have been released by the user. If so, control returns to 504; otherwise, control remains at 524. For safety and usability reasons, further actuator movement may be halted until all buttons have been released.

At 512, control resets the running global startup timer back to zero. At 528, control sets the movement flag for the present actuator. The movement flag may be stored in nonvolatile memory so that it will be retained across a power loss or shutdown. At 532, control drives the actuator in the commanded direction. At 536, control updates the stop time of the actuator to the current time. This updating of the stop time continues while the actuator is moving so that the stop time always reflects the last time at which the actuator was moving.

Control continues at 540, where control determines whether the movement command is still active. If so, control transfers to 544; otherwise, control transfers to 548. For example, the movement command may no longer be active because the user has stopped pressing the corresponding button. In another instance, the movement command may not be active because a predetermined memory position has been reached.

At 544, control determines if the actuator current is greater than zero. If so, control transfers to 552; otherwise, control transfers to 556. At 556, the actuator current has reached zero and therefore the presumption is that the actuator has reached the end of its travel. Control therefore calibrates the actuator position based on this assumption. Control then continues at 548. At 548, control clears the overcurrent flag for the actuator and control ends. The overcurrent flag, in other words, is cleared in response to movement of the actuator terminating naturally—that is, in response to the actuator reaching the end of travel or the call for actuator movement ending.

At 552, control determines whether the currently measured actuator current exceeds a limit. If so, control transfers to 560; otherwise, control continues at 532. At 560, control determines whether the overcurrent flag is already set for the actuator. If so, control transfers to 564; otherwise, control transfers to 568. At 564, control stops all actuators and may prevent the present actuator from moving again until a reset has been performed. Control continues at 572, where control remains until all buttons have been released. Once all buttons have been released, control ends. At 568, the overcurrent flag has not yet been set for the actuator, indicating that the overcurrent event may be transient. Nonetheless, control stops all actuators and continues at 576. At 576, control sets the overcurrent flag for the present actuator and continues at 524.

Figure 6:
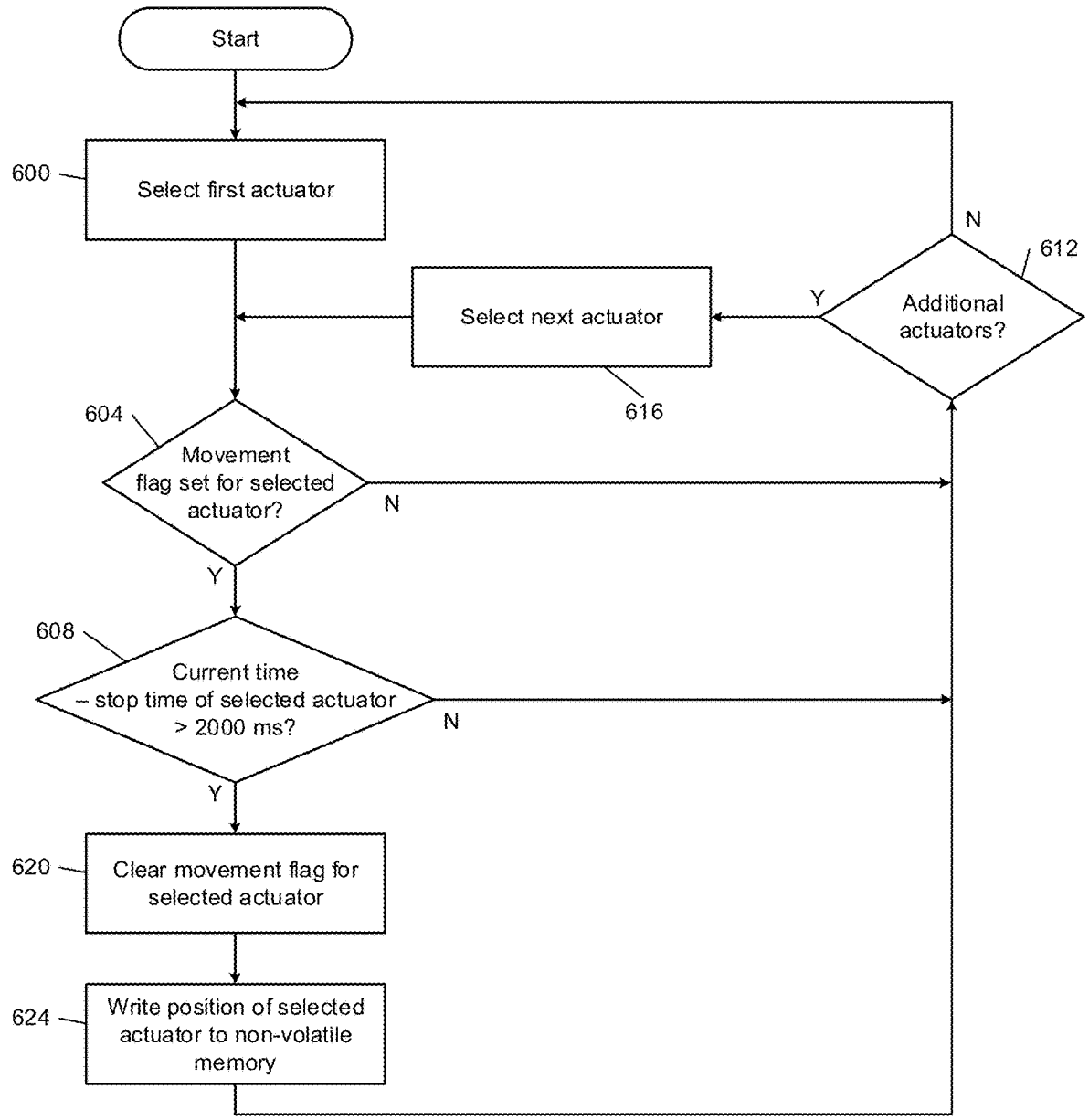
FIG. 6 is a flowchart of example operation for tracking the end of movement of the furniture actuators.

In FIG. 6, tracking the end of movement of the actuators begins at 600. The first actuator is selected and control continues at 604. At 604, control determines whether movement flag is currently set for the selected actuator. If so, control transfers to 608; otherwise, control transfers to 612. At 612, control determines whether there are additional actuators. If so, control transfers to 616; otherwise, control returns to 600 to begin processing all the actuators once more.

At 616, control selects the next actuator and continues at 604. At 608, control determines whether the current time is more than a predetermined interval after the last stop time of the selected actuator. If so, control transfers to 620; otherwise, control transfers to 612. The predetermined interval may be 2 seconds. At 620, control clears the movement flag for the selected actuator. As noted above, the movement flag may be set in nonvolatile memory to persist across power outages and shutdowns. Control continues at 624, where the current understanding of the position of the selected actuator is written to nonvolatile memory. Control then continues at 612.

Figure 7:
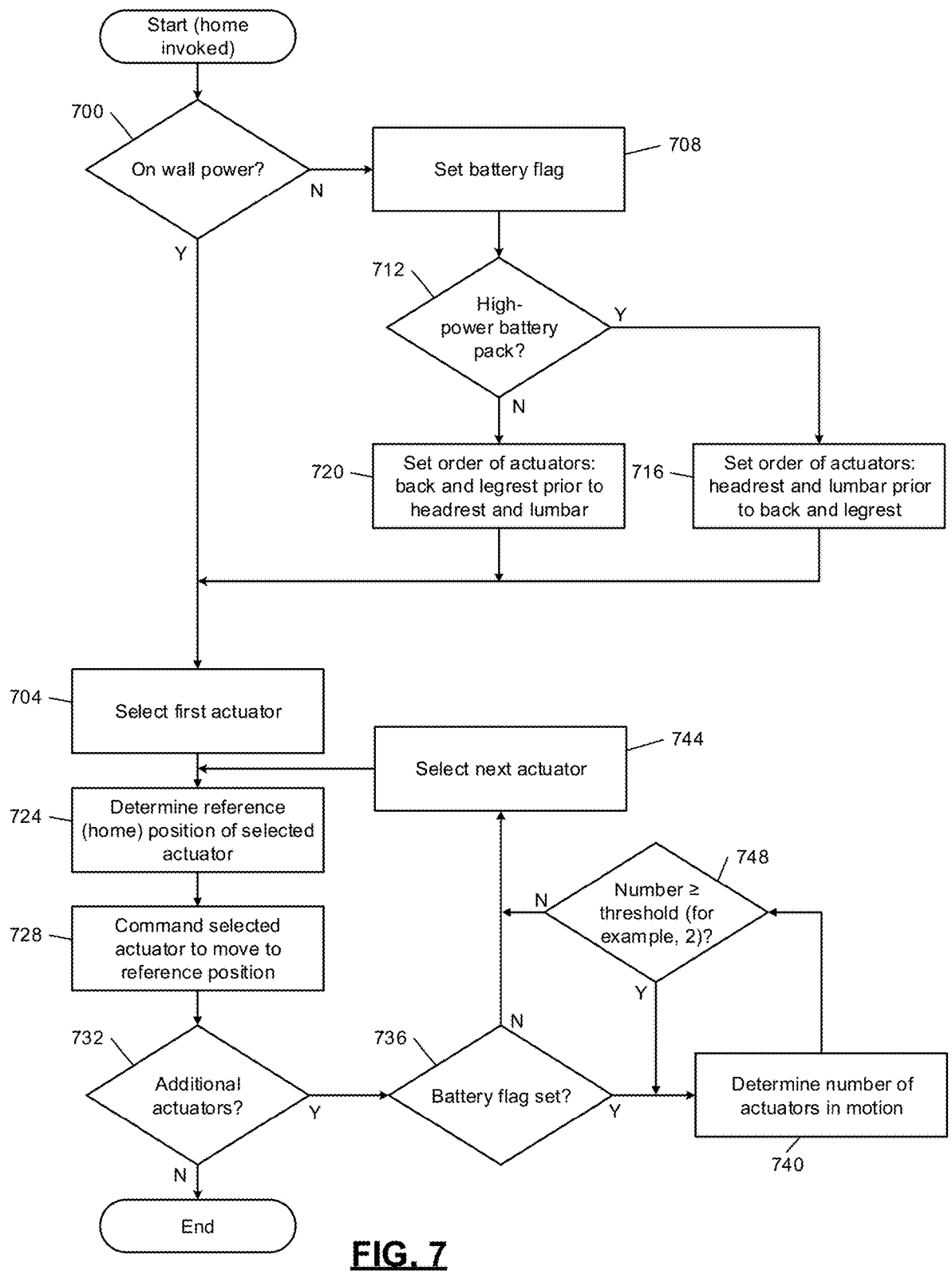
FIG. 7 is a flowchart showing example operation of returning the furniture to a home configuration.

In FIG. 7, control begins at 700 upon a home operation being invoked. As mentioned above, the home operation may be invoked by explicit user input or in order to return to a known reference state of the furniture. For example, the reference state may be invoked following a power outage or in response to the positions of actuators being suspect. At 700, control determines whether the furniture is operating on wall power. If so, control transfers to 704; otherwise, control transfers to 708.

In various implementations, control may determine whether the furniture is operating on wall power based on a voltage of the power input. For example, the power supply operating from wall power may supply a higher voltage than does a battery pack. At 708, control sets a battery flag to indicate that the furniture is operating on battery power. Control continues at 712, where control determines whether the battery pack is relatively higher power. If so, control transfers to 716; otherwise, control transfers to 720.

The battery pack may have relatively higher power when the charge storage capacity of the battery pack is higher. For example, higher charge storage capacity may correspond to a lithium ion rechargeable battery pack while a relatively lower power battery pack may be a set of 9V alkaline batteries. The identity of the battery pack may be inferred based on a voltage output of the battery pack. For example, the voltage of the rechargeable battery pack may be designed to be higher than that of an alkaline battery pack.

At 716, control establishes an order of the actuators for home movement. For example, the headrest and lumbar may be actuated prior to back and legrest being actuated. Control then continues at 704. Meanwhile, at 720, the order of actuators is set differently. For example, the back and legrest actuators may be moved prior to moving the headrest and lumbar actuators. Control also continues at 704.

At 704, control selects a first actuator in the ordered list of actuators. At 724, control determines a reference (his home) installation of the selected actuator. In various implementations, these reference positions may be established at the same time that the mapping of actuators to furniture components is performed in FIG. 3. In other words, a legrest actuator may have a predetermined reference position that corresponds to its association with the legrest.

At 728, control commands the selected actuator to move toward the reference position. For example, this may invoke the control of FIG. 5 for the selected actuator. At 732, control determines whether there are additional actuators remaining in the list that still need to move toward the reference position. If so, control transfers to 736; otherwise, control has moved all actuators and control ends.

At 736, control determines whether the battery flag is set. If so, control transfers to 740; otherwise, control transfers to 744. At 740, control determines the number of actuators currently in motion. At 748, control determines whether that number is greater than or equal to a threshold, such as two. To prevent too many actuators from moving simultaneously while on battery power, control returns to 740 until the number of actuators falls below the threshold. Control then continues at 744. At 744, control selects the next actuator and continues at 724.

Figure 8:
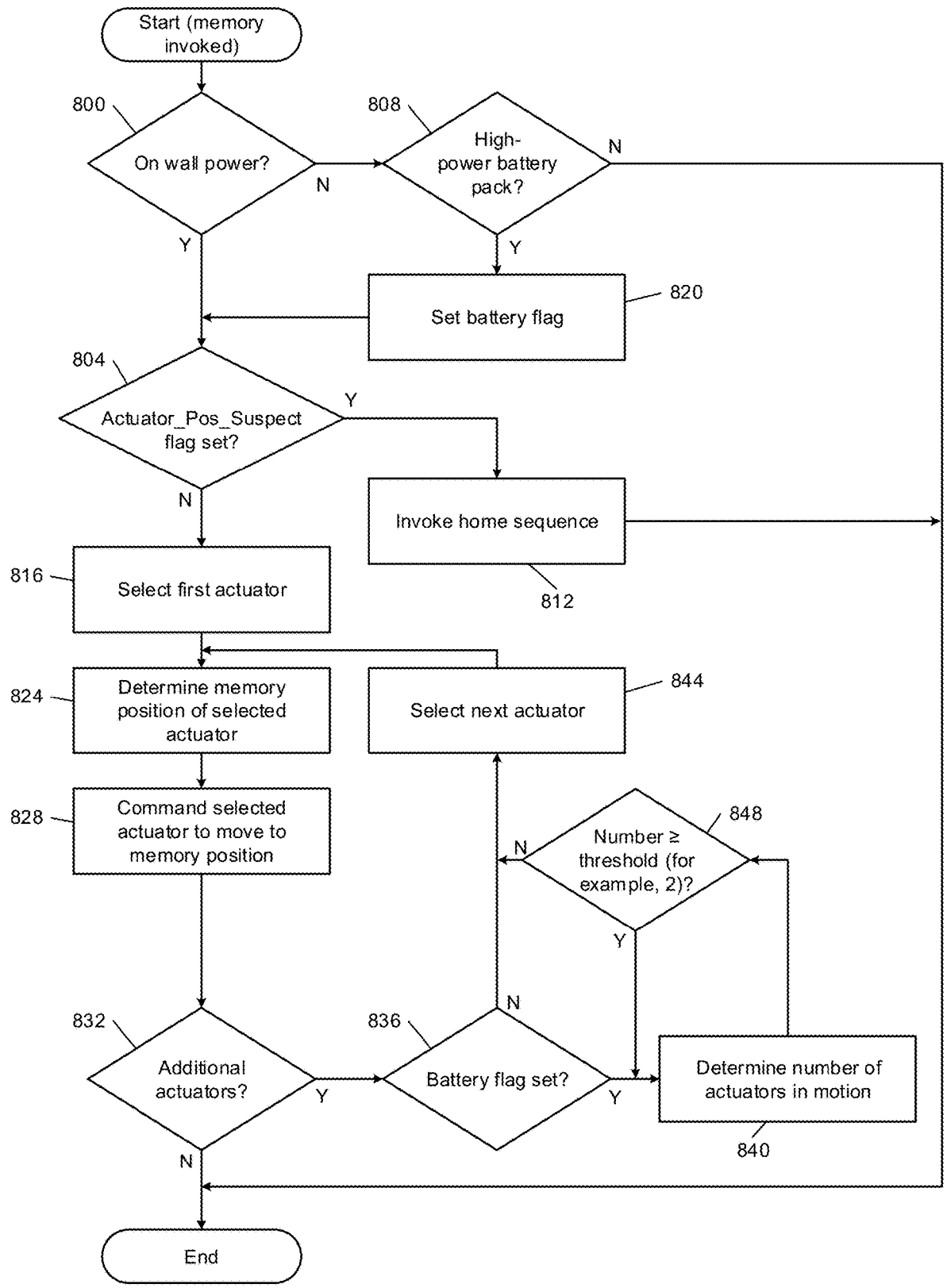
FIG. 8 is a flowchart showing example operation of moving the furniture to a predetermined memory position.

In FIG. 8, control begins when a memory position has been invoked. At 800, control determines whether the furniture is operating on wall power. If so, control transfers to 804; otherwise, control transfers to 808. At 804, control determines whether the flag indicating that actuator positions may suspect is set. If so, control transfers to 812; otherwise, control transfers to 816. At 812, control invokes a home sequence (see FIG. 7). In various implementations, an initial request for a memory position when actuator positions are suspect may cause the furniture to return to the reference position and require the memory position to be selected a second time before control will move to the memory position. In such situations, control ends following 812.

Referring back to 808, control determines whether the battery pack is relatively high-power or not. If so, control transfers to 820; otherwise, in the event of a lower-power battery pack, memory-based movement may be prohibited and control ends. At 820, control sets the battery flag and continues at 804. At 816, control selects a first actuator. At 824, control determines the stored memory position of the selected actuator. At 828, control commands the actuator to move toward the stored memory position. At 832, control determines whether there are any additional actuators to move toward the stored memory position. If so, control transfers to 836; otherwise, control ends.

At 836, if the battery flag is set, control transfers to 840; otherwise, control transfers to 844. At 840, control determines the number of actuators currently in motion. Control continues at 848, where if the number is equal to or greater than a threshold, control returns to 840; otherwise, control transfers to 844. At 844, control selects the next actuator and continues at 824.

Wireless Connections

Figure 9:
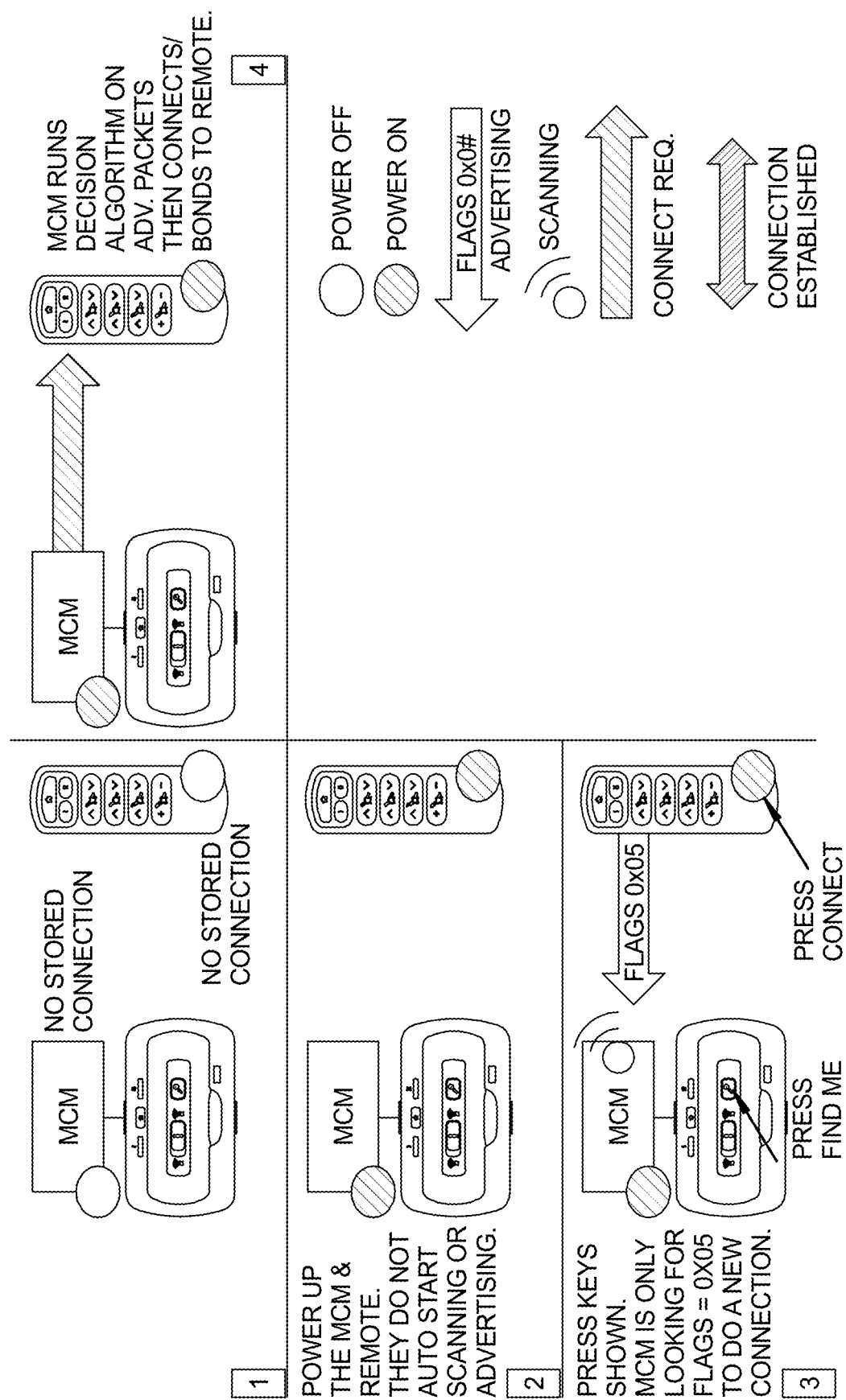
FIG. 9 is a graphical representation of a wireless communication sequence between a new control module and a new wireless remote.

FIG. 9 is a graphical representation of a wireless communication sequence between a new control module and a new wireless remote.

Figure 10:
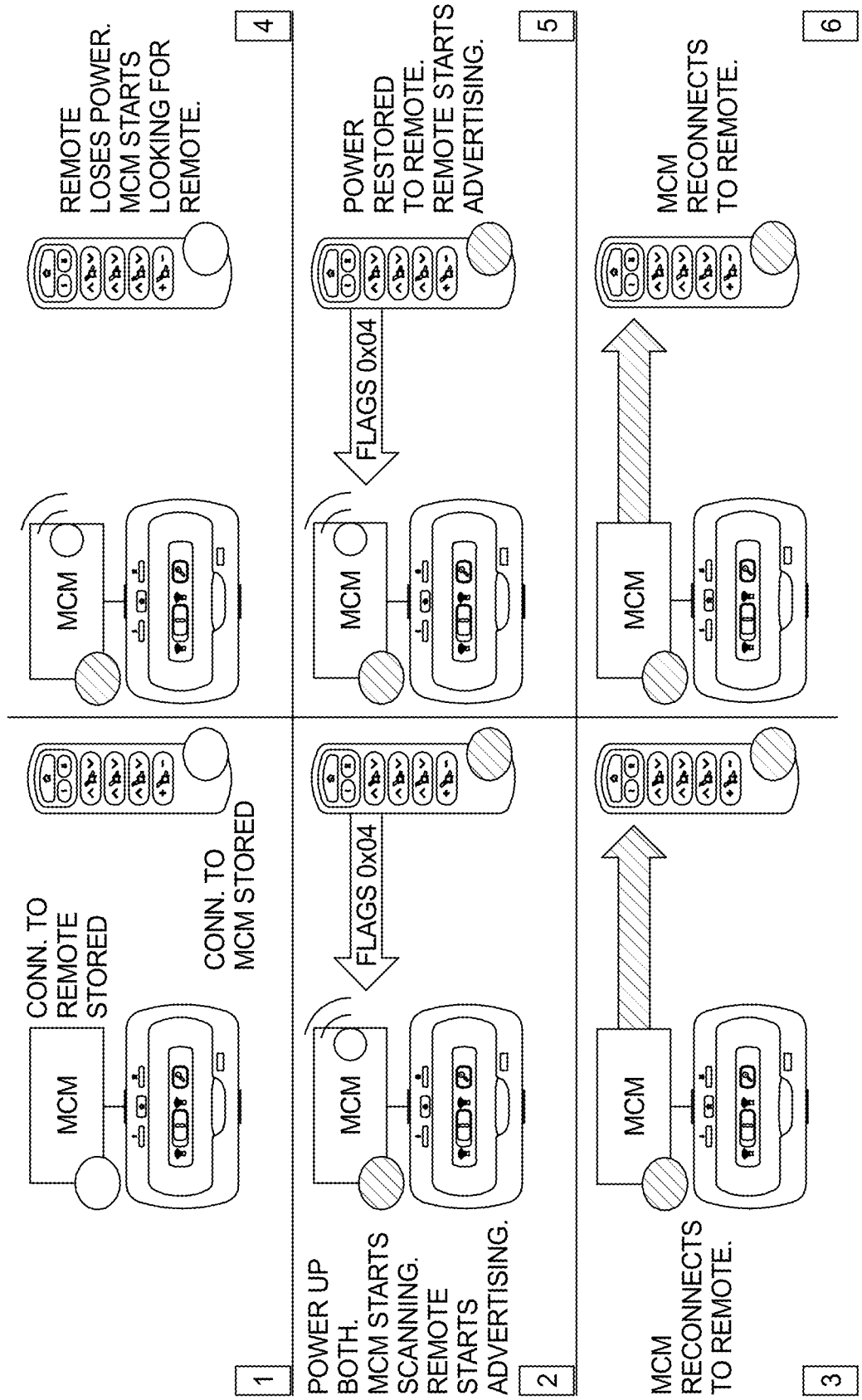
FIG. 10 is a graphical representation of a wireless communication sequence between a bonded control module and a bonded wireless remote.

FIG. 10 is a graphical representation of a wireless communication sequence upon power-up between a bonded control module and a bonded wireless remote as well as a wireless communication sequence upon restoration of power to the bonded wireless remote.

Figure 11:
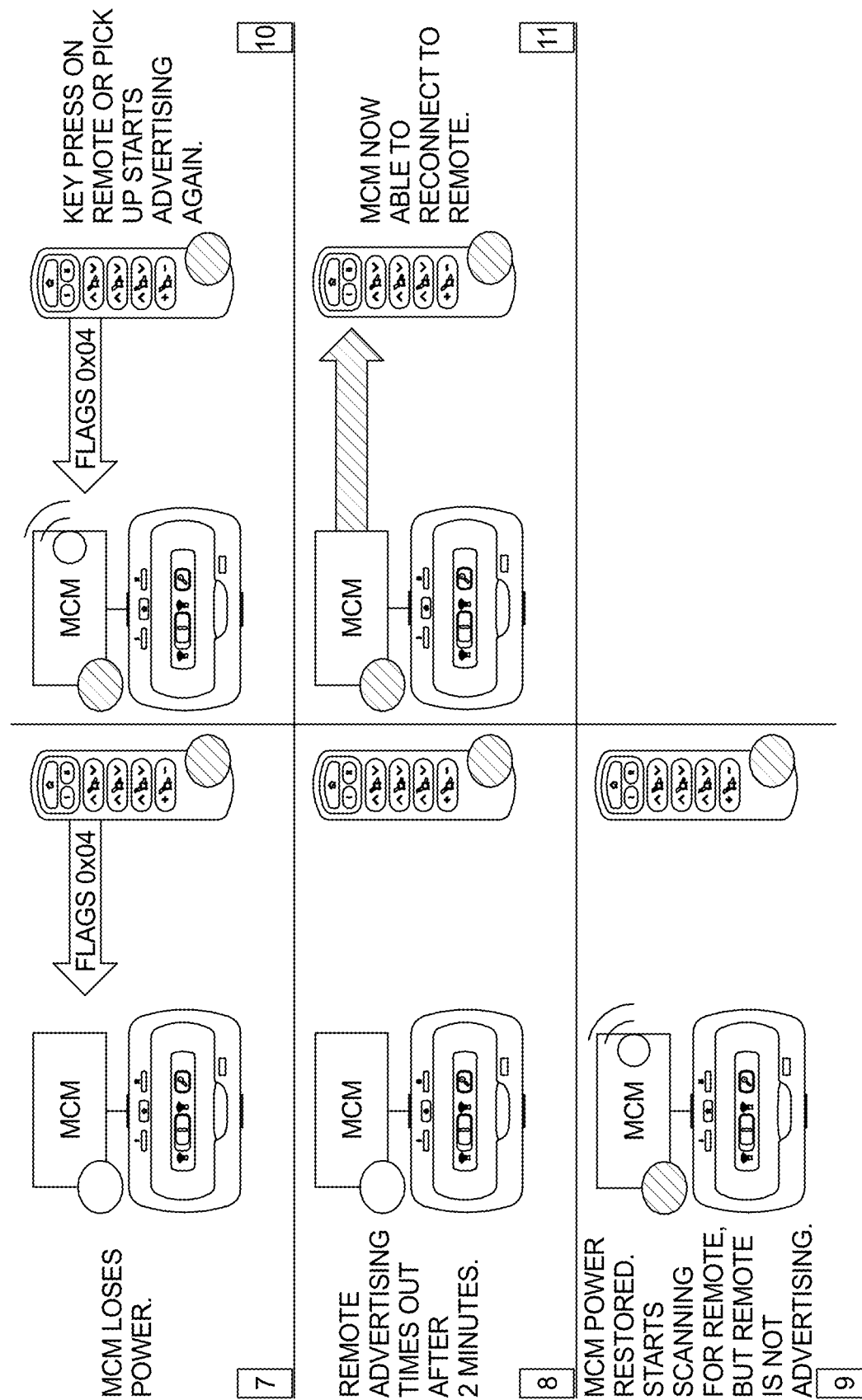
FIG. 11 is a graphical representation of an alternative wireless communication sequence between a bonded control module and a bonded wireless remote.

FIG. 11 is a graphical representation of a wireless communication sequence between a bonded control module and a bonded wireless remote upon restoration of power to the bonded control module.

Figure 12:
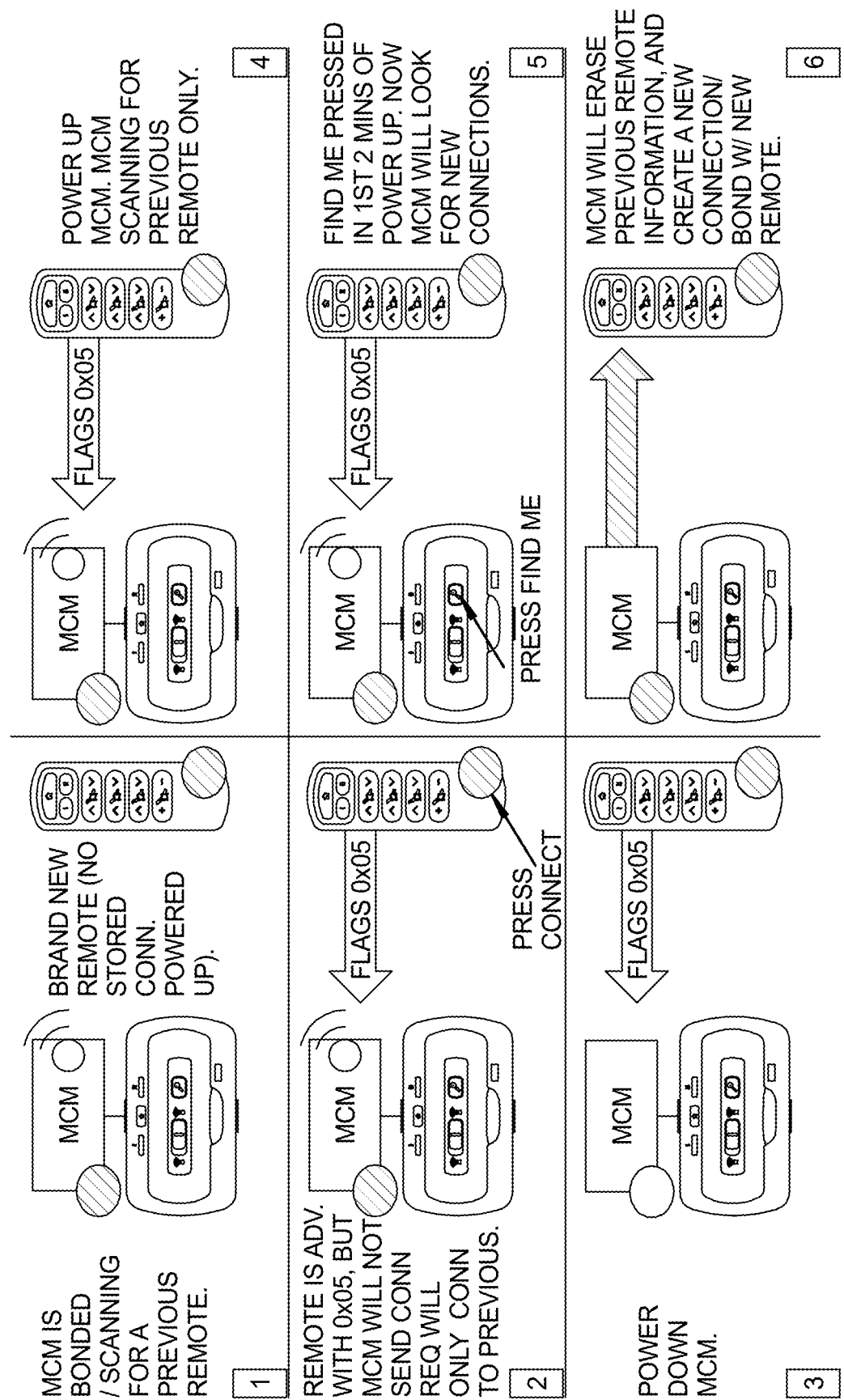
FIG. 12 is a graphical representation of a wireless communication sequence between a bonded control module and a new wireless remote.

FIG. 12 is a graphical representation of a wireless communication sequence between a bonded control module and a new wireless remote.

Figure 13:
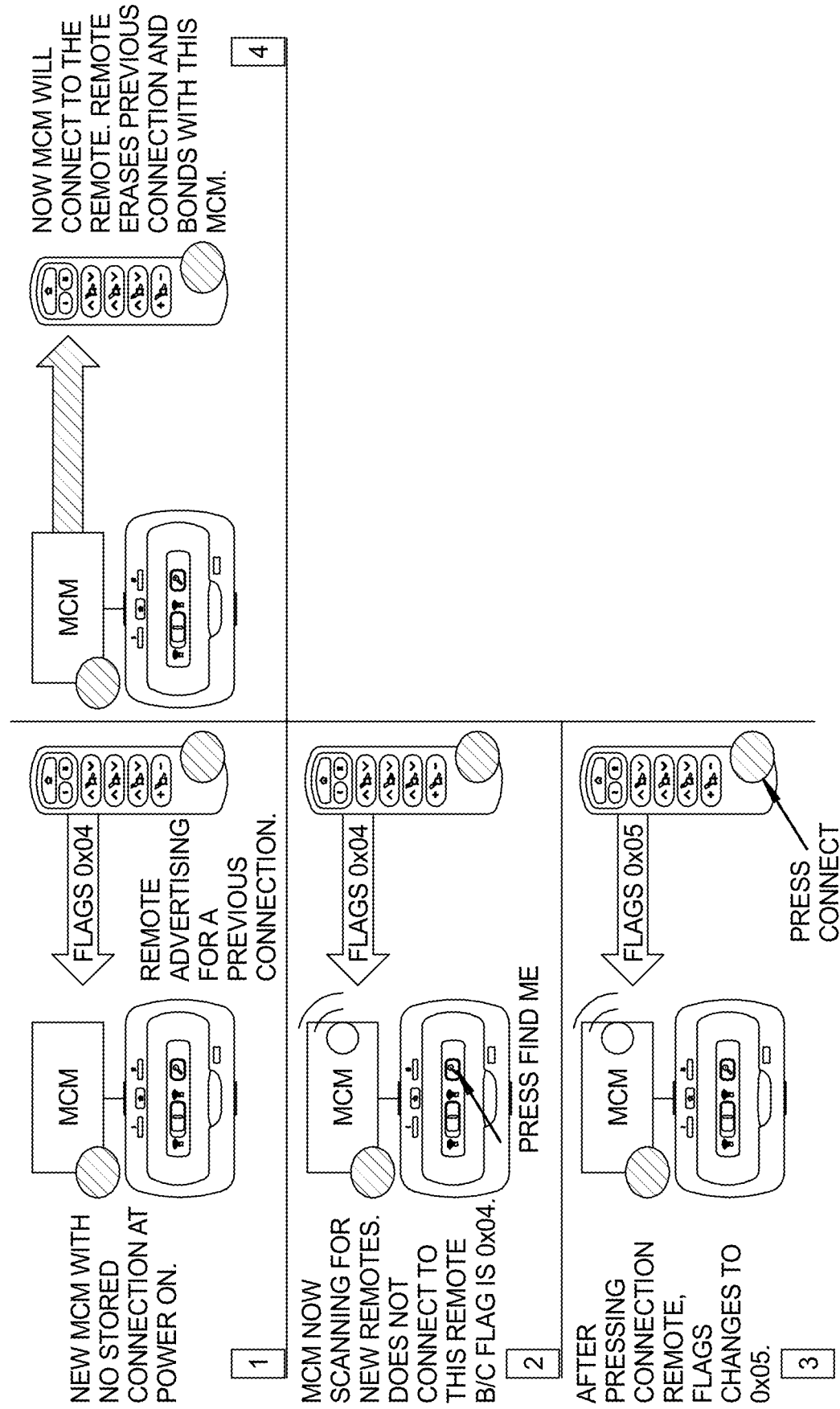
FIG. 13 is a graphical representation of a wireless communication sequence between a new control module and a bonded wireless remote.

FIG. 13 is a graphical representation of a wireless communication sequence between a new control module and a bonded wireless remote.

Figure 14:
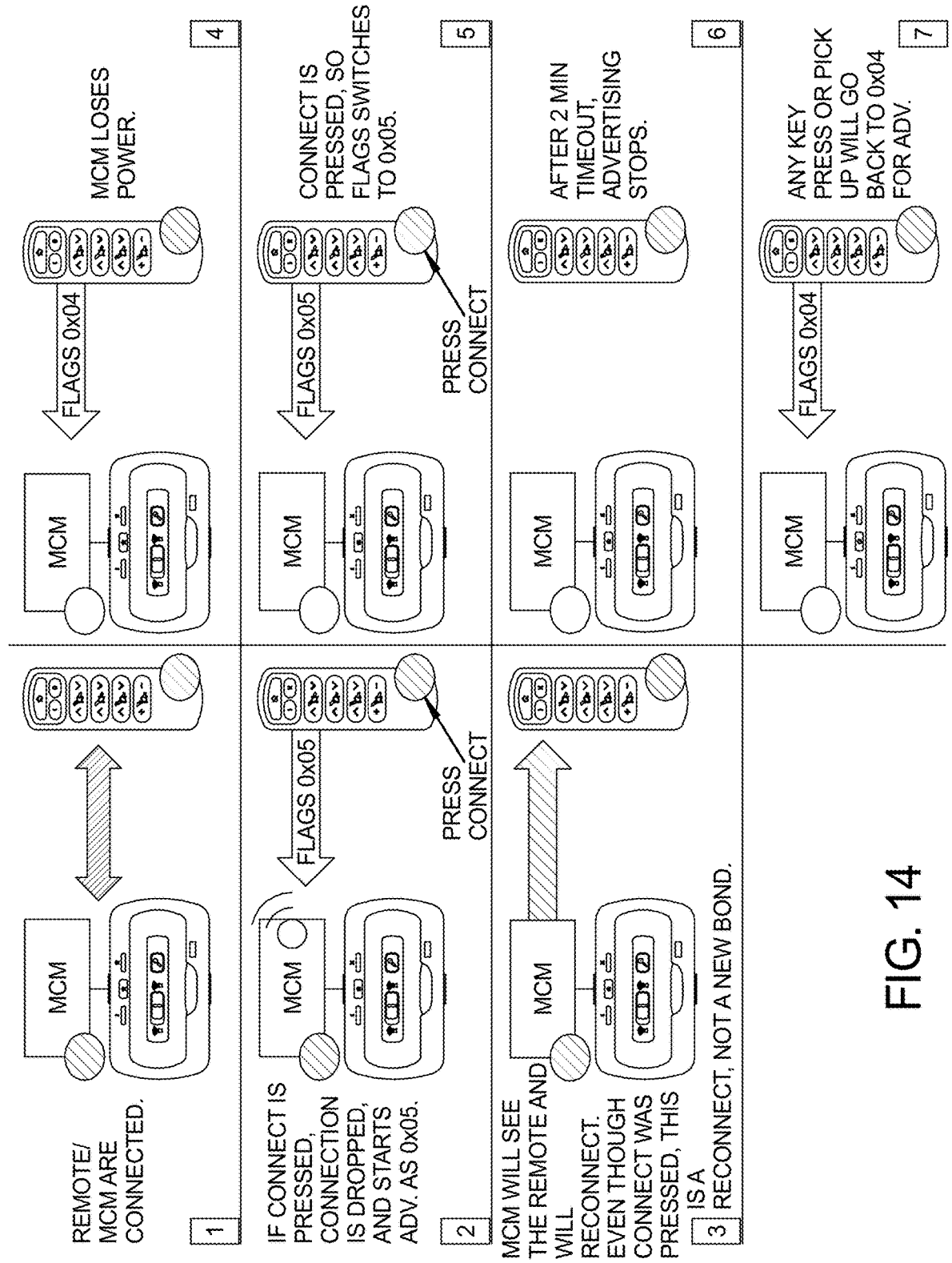
FIG. 14 is a graphical representation of a wireless communication sequence in response to a user pressing a connect button on a wireless remote.

FIG. 14 is a graphical representation of a wireless communication sequence in response to a user pressing a connect button on a wireless remote.

Figure 15:
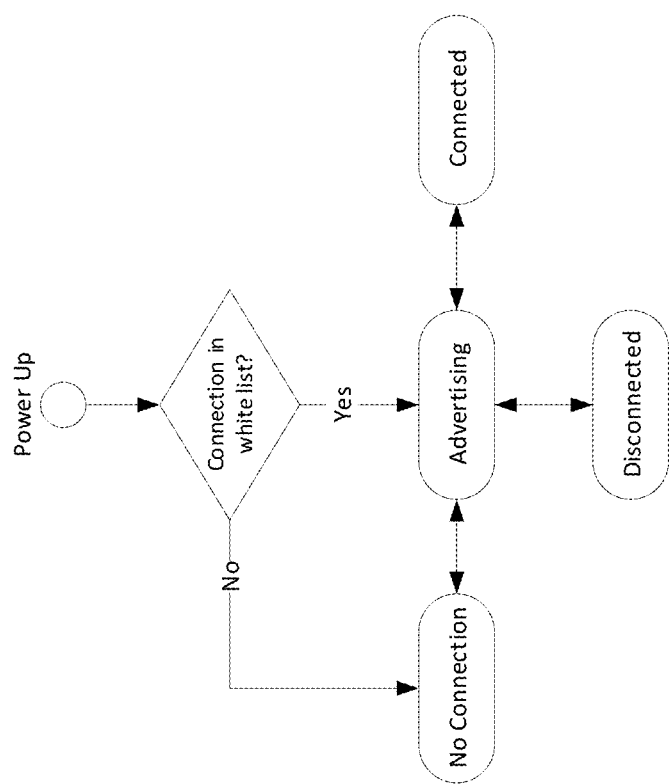
FIG. 15 is a graphical representation of a state machine for a Bluetooth low energy remote connection.

FIG. 15 depicts an example high-level process the wireless remote will follow for establishing and maintaining a connection with the master control module (MCM). At power up, the remote will check the whitelist to see if a previous connection is stored. If so, the remote will begin to advertise in order to reconnect to the MCM. If no connection is stored in the whitelist, the remote will not advertise until the connect button is pressed. The MCM and remote are intended to maintain a Bluetooth Low Energy (BLE) connection the entire time both are powered up. Loss of power, noise, and other incidents can cause the link to become disconnected. Details regarding how the connection is recovered are detailed in the following sections.

Figure 16:
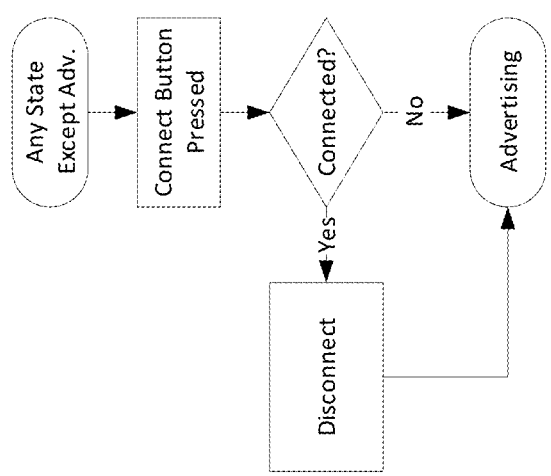
FIG. 16 is a flowchart depicting operation performed in response to pressing of a connect button.

FIG. 16 describes example steps followed when the remote is in any state (except Advertising state) and the connect button is pressed. The connect button allows the remote to force an Advertising state regardless of current state. If the connect button is pressed while in Advertising state, this will change the Flags data in the advertising packet to send out a value of 0x05 and allow for new connections to the remote to occur. While the remote is in the No Connection state, pressing the connect button will be the only method for moving to the Advertising state.

Figure 17:
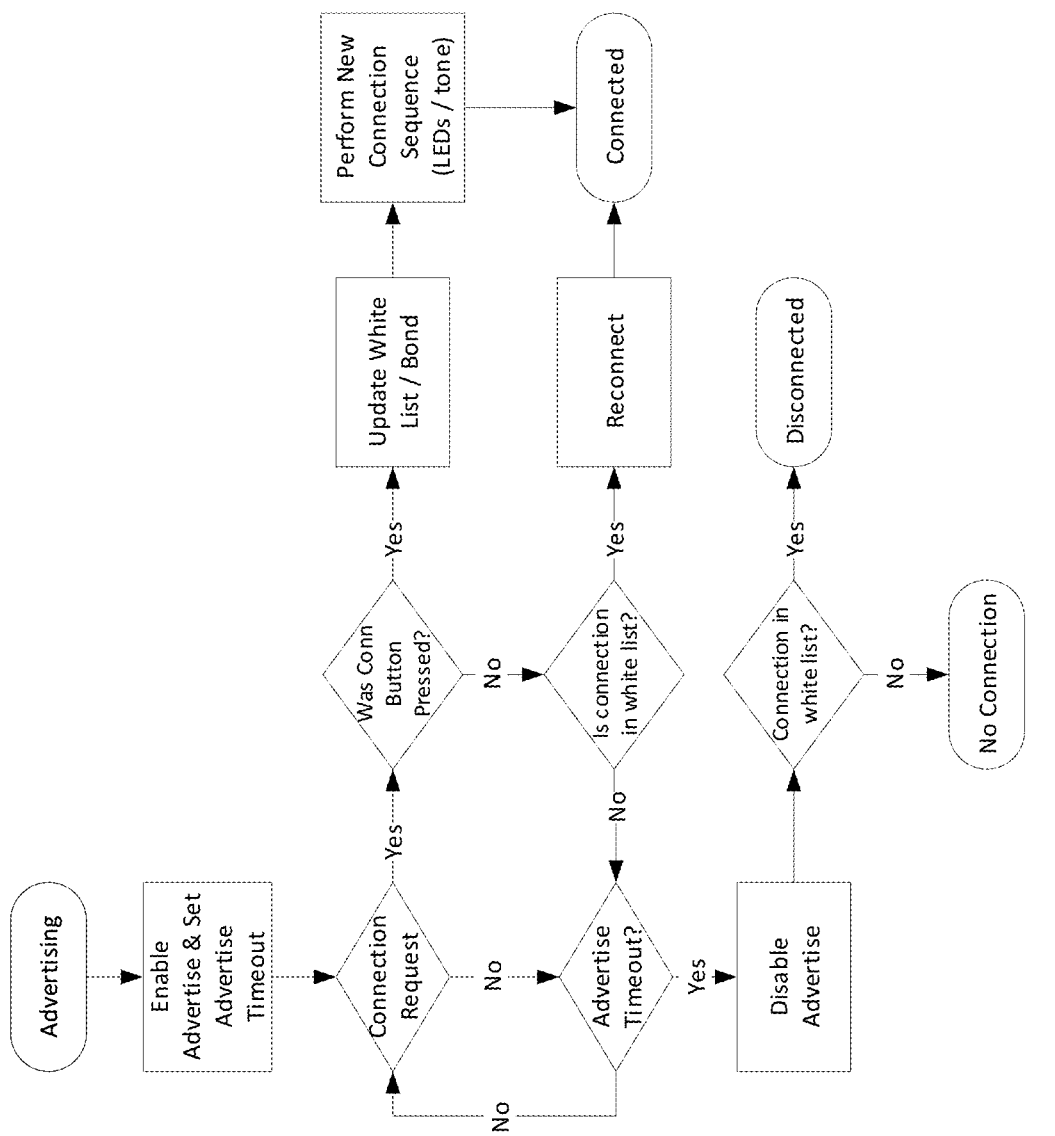
FIG. 17 is a flowchart of example wireless advertising operation.

In FIG. 17, upon entering the Advertising state, the remote will begin sending out advertising packets and will start an advertise timeout. If an MCM sends a Connection Request during the advertising window, the remote will connect to it under the following circumstances. If the connect button had been pressed, the remote will connect to the first MCM that sends a Connection Request. The remote will clear any saved connections from the whitelist (if any are present) and the new connection information will be stored. Then the remote and MCM will bond. Once bonding is completed, the remote will perform the "New Connection Sequence" defined in the product behavior specification.

If the connect button had not been pressed, the remote will only connect to the connection stored in its whitelist and will reject any Connection Request not in the whitelist. Upon reconnection the "New Connection Sequence" will not be performed. If the advertising window expires, and there has not been a successful connection, the advertising packets will stop being sent out. Then the state of the remote will be determined based on the whitelist as described in the flowchart.

Figure 18:
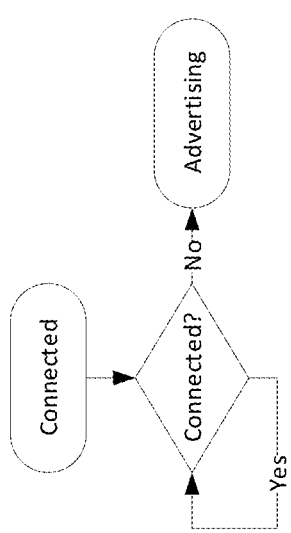
FIG. 18 is a flowchart of example operation for a remote connected to a control module.

In FIG. 18, while the remote is connected to the MCM, the connection link will be monitored. If the connection is lost with the MCM for any reason, the remote state will change to Advertising. The connect button could be pressed during the Connected state. In this case the details in FIG. 16 will be followed.

Figure 19:
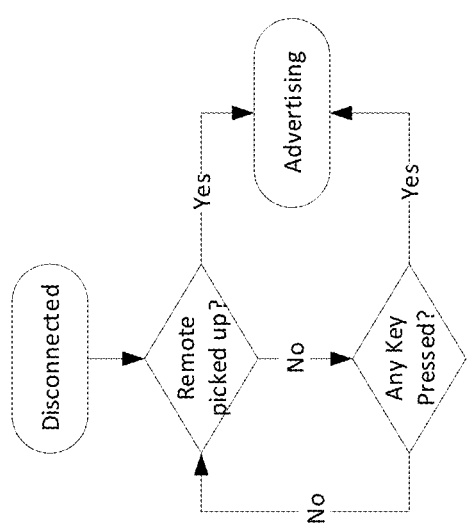
FIG. 19 is a flowchart of example operation of a remote disconnected from a control module.

Referring to FIG. 19, the remote will be in the Disconnected state when there is a connection stored in the whitelist, but failed to reconnect to the MCM during the advertising window. While in this state, the remote will monitor the keys and accelerometer to determine if the user has picked up or touched any of the keys. If either of these events occurs, the remote will move to the Advertising state in order to reconnect to the MCM. The connect button could be pressed during the Disconnected state. In this case the details in FIG. 16 will be followed.

Figure 20:
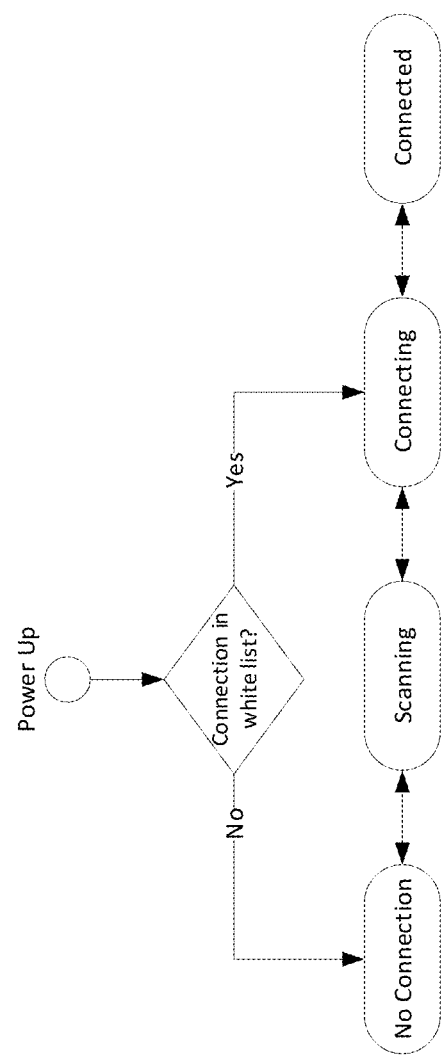
FIG. 20 is a graphical state machine for control module Bluetooth low energy connections.

Referring to FIG. 20, the following section depicts an example high-level process the MCM will follow for establishing and maintaining a connection with the remote. At power up, the MCM will check the whitelist to see if a previous connection is stored. If so, the MCM will begin the process of reconnecting to that stored connection. If no connection is stored in the whitelist, the MCM will take no action to connect to a remote. The MCM and remote are intended to maintain a BLE connection the entire time both are powered up. Loss of power, noise, and other incidents can cause the link to become disconnected. Details regarding how the connection is recovered are detailed in the following sections.

Figure 21:
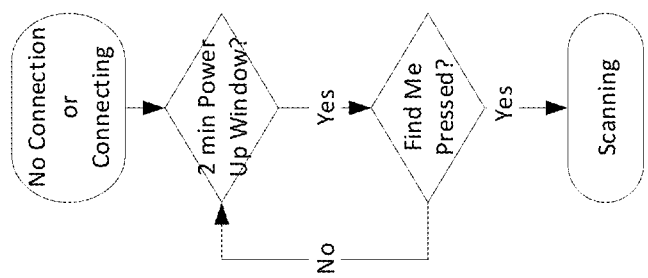
FIG. 21 is a flowchart of example operation of a control module during a new connection power-up window.

Referring to FIG. 21, at power up, the MCM will start a timer. If the Find Me/Never Lost key is pressed within the first 2 minutes, and the MCM is in either the No Connection or Connecting state, the MCM will enter the Scanning state. This allows an MCM that has no connection stored in the whitelist to start scanning for a remote to connect to. It also allows an MCM that does have an established connection to start scanning for a new connection.

Figure 22:
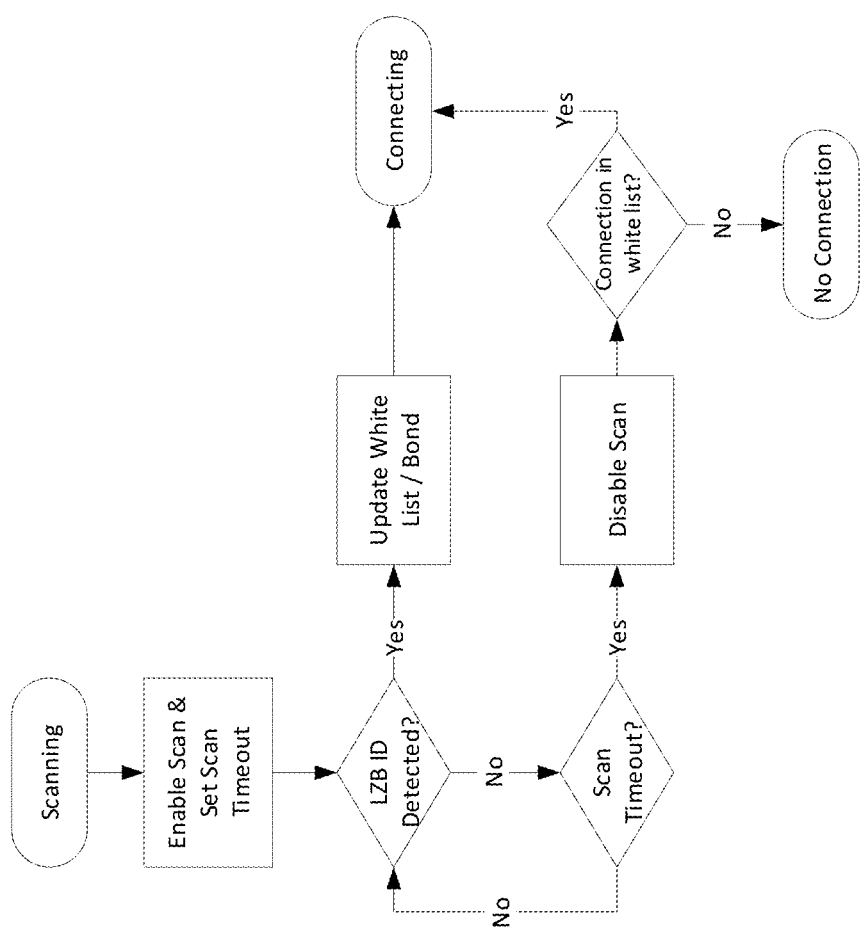
FIG. 22 is a flowchart of example scanning operation by a control module.

Referring to FIG. 22, upon entering the Scanning state, the MCM will start a scanning timer and begin scanning for BLE advertising packets. If a remote advertising packet is detected within the scanning window, the whitelist on the MCM will be updated with the new connection (if a previous connection exists) and moves to the Connecting state. If no remote advertising packets are detected during the scanning window, the MCM will stop scanning for BLE advertising packets. If a connection is stored in the whitelist, the MCM will move to the Connecting state, to attempt to connect to the previous connection. If the whitelist is empty, the MCM will move to the No Connection state.

Figure 23:
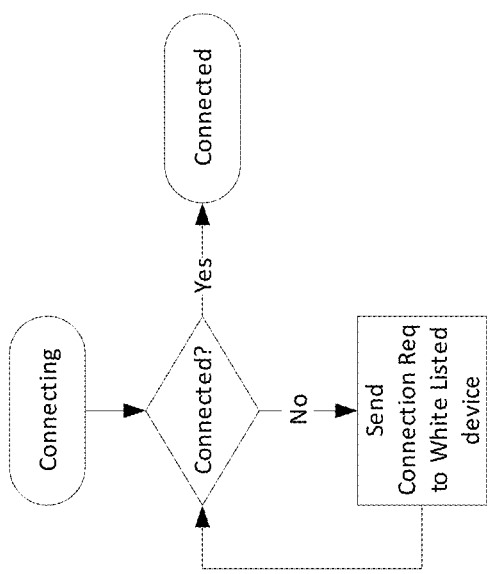
FIG. 23 is a flowchart of example connecting operation by a control module.

Referring to FIG. 23, while in the Connecting state, the MCM will continuously send connection requests to the connection in its whitelist. If a connection is established the MCM will move to the Connected state. The only other way to exist the Connecting state is to use the Find Me/Never Lost key during the new connection power up window detailed in FIG. 21.

Figure 24:
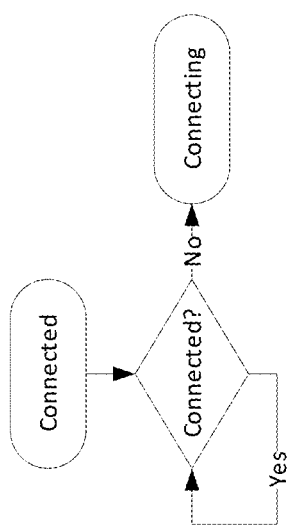
FIG. 24 is a flowchart of example operation of a control module while connected to a remote.

Referring to FIG. 24, while the MCM is connected to the remote, the connection link will be monitored. If the connection is lost with the remote for any reason, the MCM state will change to Connecting.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for a piece of furniture, the control system comprising:
   a control panel configured to receive input from a user;
   a control module configured to communicate with the control panel and to control a plurality of actuators coupled to movable components of the piece of furniture, and
   a battery system configured to store energy from mains electricity and provide the energy to the control module in the absence of the mains electricity,
   wherein the control module is configured to, in response to the input from the user indicating an intent to return the movable components to respective home positions, perform a homing sequence including:
      selecting a first actuator of the plurality of actuators according to a specified order;
      determining a home location for the selected actuator according to the home position of a respective one of the movable components;
      beginning to drive the selected actuator toward the home location;
      repeatedly selecting a next actuator of the plurality of actuators according to the specified order and repeating the determining and the beginning for the next actuator;
      determining whether the mains electricity is present; and
      in response to determining that the mains electricity is absent, pausing the repeatedly selecting while a threshold number of the plurality of actuators are in motion and resuming the repeatedly selecting once less than the threshold number of the plurality of actuators are in motion.

2. The control system of claim 1 wherein the home positions of the movable components correspond to a configuration of the piece of furniture that is easiest for the user to exit from.

3. The control system of claim 1 wherein the threshold number is 2.

4. The control system of claim 1 wherein the control module is configured to adjust the specified order according to a capacity of the battery system.

5. The control system of claim 4 wherein:
   the movable components include a leg supporting component and a head supporting component;
   the control module is configured to place the leg supporting component prior to the head supporting component in the specified order in response to the capacity of the battery system being below a first capacity; and
   the control module is configured to place the head supporting component prior to the leg supporting component in the specified order in response to the capacity of the battery system being above the first capacity.

6. The control system of claim 1 wherein the control module is configured to, in response to the input from the user indicating an intent to move the movable components to a first configuration of positions that are different from the home positions:
   determine whether the mains electricity is present; and
   in response to concurrence of the mains electricity being absent and a capacity of the battery system being below a first capacity, ignore the intent to move the movable components to the first configuration.

7. The control system of claim 6 wherein the control module is configured to, in response to the input from the user indicating the intent to move the movable components to the first configuration:
   determine whether the mains electricity is present; and
   in response to concurrence of the mains electricity being absent and the capacity of the battery system being greater than the first capacity, limit a number of concurrently moving actuators to a specific number.

8. The control system of claim 1 wherein the control module is configured to:
   read, from the plurality of actuators, position data;
   set an indeterminate position flag in response to the position data representing an unexpected configuration of the movable components; and
   perform the homing sequence in response to the indeterminate position flag being set.

9. The control system of claim 8 wherein the control module is configured to set the indeterminate position flag in response to a determination that a factory positioning sequence has not yet been performed for the piece of furniture.

10. The control system of claim 8 wherein the control module is configured to set the indeterminate position flag in response to a determination upon power-on of the control module that at least one of the plurality of actuators was in motion at a time that power was lost to the control module.

11. The control system of claim 1 further comprising:
   a multi-conductor connector between the control panel and the control module,
   wherein the control panel is configured to:
      measure a voltage on a predetermined conductor of the multi-conductor connector and
      interpret the user input according to the voltage.

12. The control system of claim 11 wherein the control panel is configured to:
   receives first and second user inputs;
   in response to the voltage being greater than a threshold, interpret the first user input as an intent to move one of the plurality of actuators in a first direction and the second user input as an intent to move the one of the plurality of actuators in a second direction opposite the first direction; and
   in response to the voltage being less than the threshold, interpret the first user input as an intent to move the one of the plurality of actuators in the second direction and the second user input as an intent to move the one of the plurality of actuators in the first direction.

13. The control system of claim 11 wherein:
   the control panel includes a microcontroller with a plurality of pins and
   the microcontroller is configured to measure the voltage using a predetermined pin of the plurality of pins and subsequently use the predetermined pin to output audio data from the microcontroller.

14. A method of operating a control system for a piece of furniture, the method comprising:
   receiving input from a user;
   in response to input from the user indicating an intent to return movable components of the piece of furniture to respective home positions, performing a homing sequence including:
      selecting a first actuator of a plurality of actuators according to a specified order;
      determining a home location for the selected actuator according to the home position of a respective one of the movable components;
      beginning to drive the selected actuator toward the home location;
      repeatedly selecting a next actuator of the plurality of actuators according to the specified order and repeating the determining and the beginning for the next actuator;
      determining whether mains electricity is present; and
      in response to determining that the mains electricity is absent, pausing the repeatedly selecting while a threshold number of the plurality of actuators are in motion and resuming the repeatedly selecting once less than the threshold number of the plurality of actuators are in motion.

15. The method of claim 14 further comprising adjusting the specified order according to a capacity of a battery system of the control system.

16. The method of claim 15 wherein:
   the movable components include a leg supporting component and a head supporting component;
   the method further comprises placing the leg supporting component prior to the head supporting component in the specified order in response to the capacity of the battery system being below a first capacity; and
   the method further comprises placing the head supporting component prior to the leg supporting component in the specified order in response to the capacity of the battery system being above the first capacity.

17. The method of claim 14 further comprising, in response to the input from the user indicating an intent to move the movable components to a first configuration of positions that are different from the home positions:
   determining whether the mains electricity is present; and
   in response to concurrence of the mains electricity being absent and a capacity of a battery system of the control system being below a first capacity, ignoring the intent to move the movable components to the first configuration.

18. The method of claim 17 further comprising, in response to the input from the user indicating the intent to move the movable components to the first configuration:
   determining whether the mains electricity is present; and
   in response to concurrence of the mains electricity being absent and the capacity of the battery system being greater than the first capacity, limiting a number of concurrently moving actuators to a specific number.

19. The method of claim 14 further comprising:
   reading, from the plurality of actuators, position data;
   setting an indeterminate position flag in response to the position data representing an unexpected configuration of the movable components; and
   performing the homing sequence in response to the indeterminate position flag being set.

20. The method of claim 19 further comprising setting the indeterminate position flag in response to a determination that at least one of the plurality of actuators was in motion at a time that the mains electricity was lost.

* * * * *